US008273423B2

(12) United States Patent
Yoshioka et al.

(10) Patent No.: US 8,273,423 B2
(45) Date of Patent: Sep. 25, 2012

(54) COLOR FILTER SUBSTRATE, LIQUID CRYSTAL DISPLAY DEVICE, PRODUCTION METHOD OF COLOR FILTER SUBSTRATE, PRODUCTION METHOD OF LIQUID CRYSTAL DISPLAY DEVICE

(75) Inventors: Hirokazu Yoshioka, Mie (JP); Keiichi Tanaka, Mie (JP); Atsuhito Murai, Tokyo (JP); Yasutoshi Murakami, Nara (JP); Yoshitaka Okumoto, Mie (JP); Satoru Kishimoto, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 1157 days.

(21) Appl. No.: 11/663,584

(22) PCT Filed: Sep. 16, 2005

(86) PCT No.: PCT/JP2005/017172
§ 371 (c)(1),
(2), (4) Date: Mar. 23, 2007

(87) PCT Pub. No.: WO2006/035621
PCT Pub. Date: Apr. 6, 2006

(65) Prior Publication Data
US 2008/0286528 A1  Nov. 20, 2008

(30) Foreign Application Priority Data
Sep. 29, 2004 (JP) .................................. 2004-285076

(51) Int. Cl.
*B05D 5/06* (2006.01)
(52) U.S. Cl. ............ 428/1.31; 349/106; 349/192; 430/7; 347/106; 427/162; 427/163.2; 427/558

(58) Field of Classification Search .................. 428/1.31; 349/106–110, 192; 430/7; 347/106–107; 427/162, 163.2, 558
See application file for complete search history.

(56) References Cited

U.S. PATENT DOCUMENTS
5,714,195 A * 2/1998 Shiba et al. ................... 427/140
(Continued)

FOREIGN PATENT DOCUMENTS
JP  03-274504 A  12/1991
(Continued)

OTHER PUBLICATIONS
JPO Website Machine English Translation of JP05-027110, Matsuhiro et al, Feb. 5, 1993.*
(Continued)

*Primary Examiner* — Sophie Hon
(74) *Attorney, Agent, or Firm* — Birch, Stewart, Kolasch & Birch, LLP

(57) ABSTRACT

To provide: a color filter substrate with high display quality in which defective portions of a bank member (black matrix), such as a pin hole, a portion having an insufficient film thickness, a portion having an insufficient width, and a disconnection portion, or color mixing defects of a colored layer are corrected by the simple and inexpensive method; a liquid crystal display device including such a color filter; and production methods thereof. The color filter substrate of the present invention is a color filter substrate comprising a bank member and a colored layer on a substrate, wherein the color filter substrate has a structure in which a color mixing member formed of colored layer materials of two or more colors is formed in a defective portion of the bank member or along the bank member.

43 Claims, 9 Drawing Sheets

U.S. PATENT DOCUMENTS

| | | | |
|---|---|---|---|
| 6,232,022 B1 * | 5/2001 | Fujiike et al. | 430/7 |
| 6,828,069 B1 * | 12/2004 | Nakazawa et al. | 430/7 |
| 6,893,782 B2 * | 5/2005 | Lee et al. | 430/7 |
| 7,045,258 B2 * | 5/2006 | Chen et al. | 430/7 |
| 7,288,346 B2 * | 10/2007 | Kobayashi et al. | 430/7 |
| 7,491,477 B2 * | 2/2009 | Fukai et al. | 430/7 |
| 7,612,861 B2 * | 11/2009 | Kwon et al. | 349/158 |
| 2004/0130606 A1 * | 7/2004 | Tawaraya et al. | 347/100 |
| 2006/0001801 A1 * | 1/2006 | Kim et al. | 349/106 |

FOREIGN PATENT DOCUMENTS

| | | |
|---|---|---|
| JP | 05-27111 A | 2/1993 |
| JP | 5-72528 A | 3/1993 |
| JP | 07-318724 A | 12/1995 |
| JP | 08-292312 A | 11/1996 |
| JP | 11-271752 A | 10/1999 |
| JP | 2002-055220 A | 2/2002 |
| JP | 2002-071939 A | 3/2002 |
| JP | 2003-098336 A | 4/2003 |
| JP | 2003-322844 A | 11/2003 |
| JP | 2004-13133 A | 1/2004 |
| JP | 2004-53971 A | 2/2004 |
| JP | 2004-077905 A | 3/2004 |
| JP | 2006-098760 A | 4/2006 |

OTHER PUBLICATIONS

JPO Website Machine English Translation of JP2005-067007, Nakayama et al, Mar. 17, 2005.*

JPO Website Machine English Translation of JP 2003-322844, Ishida et al., Nov. 14, 2003.*

* cited by examiner (a)

(b)

(c)

(a)

(b)

(c)

(d)

(a)

(b)

(c)

(d)

COLOR FILTER SUBSTRATE, LIQUID CRYSTAL DISPLAY DEVICE, PRODUCTION METHOD OF COLOR FILTER SUBSTRATE, PRODUCTION METHOD OF LIQUID CRYSTAL DISPLAY DEVICE

This application is a 371 national stage entry of PCT/JP05/17172 filed Sep. 16, 2005.

TECHNICAL FIELD

The present invention relates to color filter substrates, liquid crystal display devices, production methods of color filter substrates and liquid crystal display devices. More specifically, the present invention relates to a color filter substrate preferably used as a substrate for liquid crystal display panels, and a liquid crystal display device including such a color filter substrate, and production methods thereof.

BACKGROUND ART

Improvement in yield has been needed for production of liquid crystal display devices in order to suppress increase in production costs. In production steps of a color filter (CF) substrate as one major member, for example, a method of properly correcting some defects such as lack and contamination, generated in a colored layer or a light-shielding layer has been needed. Application of an ink jet method has been recently investigated as a method of forming a colored layer of the CF substrate. In this case, for example, a liquid material (ink) is added dropwise in each pixel region surrounded by a bank member and then dried and solidified, and thereby a colored layer is formed. However, in the case where the colored layer is formed by the ink jet method, the ink droplets added in different pixel regions are mixed if the bank member has a defective portion, which generates color mixing defective pixels. Therefore, in such a case, a method of correcting the bank member or the color mixing defective pixels has been needed.

As a conventional method of correcting the defects of the CF substrate, a correction method of ejecting a black coloring agent into an abnormal (defective) part such as color void and color mixing of a filter element (pixel) was disclosed (for example, referring to Patent Document 1). A correction method of ejecting a correction liquid with a neutral color into a defective part generated in a colored layer and a light-shielding layer was disclosed (for example, referring to Patent Document 2). Further, a correction method of ejecting a coloring agent of a specified color into an abnormal part such as color void and color irregularity of a filter element was disclosed (for example, referring to Patent Document 3).

However, if these methods are used to correct the bank member or the colored layer, a coloring material for correction is additionally needed in addition to the coloring material used for forming the color layer. In such a respect, there was room for improvement.

With this respect, a method of correcting a pin hole generated in a colored layer by ejecting a coloring material of a color corresponding to a color of the colored layer, without additionally preparing a coloring material for correction, was disclosed (for example, referring to Patent Document 4).

However, this method is thought to be unsuitable for correcting a pin hole generated in a bank formed in a light-shielding region, in terms of light transmittance.

As for the correction method of the defects of the CF substrate, a method of irradiating a defective part with laser light such as excimer laser beam was proposed as a method of removing the defective part (for example, referring to Patent Documents 5 to 8). The defective part is removed by such methods and then a colored layer is formed again at the part from which the defect is removed.

If a color mixing defect is generated in production of a CF substrate using an ink jet device, generally, the color mixing defect spreads into the entire pixel region. Therefore, the entire surface of the pixel region needs to be opened. As a conventional technology for this respect, a method of removing almost the entire color element (pixel) (one pixel) having a defect such as white defect by a laser processing treatment and the like was disclosed (for example, referring to Patent Document 9). However, in these methods, there is a possibility that when the pixel region once causing the color mixing defect is colored again by the ink jet method, the surface of the bank surrounding the pixel regions may exhibit insufficient lyophobicity, and the color mixing defect may be possibly caused again.

Particularly when fluorine plasma treatment is performed as a lyophobic treatment after the pixel opening, the lyophobicity exhibited on the bank surface depends on the bank or a deposit on the bank, and therefore sufficient lyophobicity may not be obtained and the ink may not be kept at a desired position.

[Patent Document 1]
Japanese Kokai Publication No. Hei-08-292312 (pages 2 and 13, FIG. 9)
[Patent Document 2]
Japanese Kokai Publication No. 2003-98336 (pages 2 and 13, FIG. 3(b))
[Patent Document 3]
Japanese Kokai Publication No. Hei-07-318724 (pages 2 and 14, FIG. 7)
[Patent Document 4]
Japanese Kokai Publication No. Hei-11-271752 (pages 2 and 6, FIG. 3)
[Patent Document 5]
Japanese Kokai Publication Hei-05-72528 (pages 2 and 5, FIG. 1)
[Patent Document 6]
Japanese Kokai Publication No. 2004-53971 (pages 2 and 11, FIG. 1)
[Patent Document 7]
Japanese Kokai Publication No. 2004-13133 (pages 2 and 9, FIG. 2)
[Patent Document 8]
Japanese Kokai Publication No. Hei-05-27111 (pages 2 and 4, FIG. 1)
[Patent Document 9]
Japanese Kokai Publication No. Hei-03-274504 (pages 1 and 3, FIG. 3b)

DISCLOSURE OF INVENTION

The present invention has been made in view of the above-mentioned state of the art. The present invention has an object to provide: a color filter substrate with high display quality, in which a defective portion of a bank member or a color mixing defect of a colored layer is corrected by the simple and inexpensive method; a liquid crystal display device including such a color filter substrate; and production methods thereof.

The present inventors made various investigations on methods of correcting a defective portion of a bank member or a color mixing defect of a colored layer in a color filter substrate, and noted that a material forming the colored layer (colored layer material) is used for correction. The inventors found that if the colored layer is formed by adding a colored layer material-containing droplet by an ink jet method and the like, colored layer material-containing droplets of two or more colors are mixed and thereby a color mixing member with a light-shielding property can be formed. The inventors further found that a color mixing member formed of colored layer materials of two or more colors or a colored layer material itself (one-color member) is used as a member for repairing the defective portion of the bank member, and thereby the defective portion of the bank member can be simply and inexpensively repaired, and also found that when pixels with a color mixing defect (color mixing defective pixels) are corrected, the color mixing member formed in the outer edge of the pixels (along the bank member) is not removed to be left, and the left color mixing member is alternatively used as a bank, and thereby lyophilic or lyophobic properties of the bank surrounding the color mixing defective pixels can be controlled. The inventors found that such correction of the defective portion of the bank member or the color mixing defect of the colored layer is performed, and thereby a color filter substrate which has high display quality and hardly includes defective pixels can be obtained. As a result, the above-mentioned problems can be admirably solved, leading to completion of the present invention.

That is, the present invention is a color filter substrate comprising a bank member and a colored layer on a substrate, wherein the color filter substrate has a structure in which a color mixing member formed of colored layer materials of two or more colors is formed in a defective portion of the bank member or along the bank member. In the present description, the terms "or more" and "or less" mean that the value described is included. In accordance with the present invention, the color mixing member formed of colored layer materials of two or more colors is alternatively used as a member for repairing the defective portion or the peripheral portion of the bank member. Therefore, a color filter substrate with high display quality in which light leakage is sufficiently suppressed, and the color mixing defective pixel is hardly included. If the color mixing is not generated in the entire color mixing defective pixel, the colored layer material with no color mixing (one-color member) may be left in the outer edge of the color mixing defective pixels, in addition to the color mixing member. This one-color member preferably has the same color as a color of the pixel after corrected. The CF substrate of the present invention can be preferably used as a substrate for liquid crystal display panels by being appropriately provided with a protective layer of the colored layer, a counter electrode and the like. The above-mentioned color mixing member are formed of two or more colors of materials forming color layers (colored layer materials) and is not especially limited as long as the colors of the colored layer materials are subtractively mixed. The above-mentioned color mixing member has a single layer structure in which the colored layer materials are mixed and contained in one layer, or has a multi-layer structure in which the colored layer materials are separately contained in a plurality of layers. Among them, a form in which the colored layer materials of two or more colors are mixed is preferable, and a form in which the colored layer materials of two or more colors are substantially uniformly mixed is more preferable. The color mixing member preferably contains substantially equivalent amounts of the colored layer materials of two or more colors. The material, shape, and size of the above-mentioned bank member are not especially limited as long as it is a structure (projection, wall, bank) partitioning a plurality of colored layer-formed regions. In the CF substrate of the present invention, the entire defective portion or the entire periphery of the bank member is not necessarily repaired with the color mixing member. At least part of the defective portion or the periphery of the bank member is repaired with the color mixing member.

It is preferable that at least part of the bank member is constituted by a black matrix. In this case, it is preferable that the defective portion of the bank member is a through-hole (pin hole) formed in a black matrix. In such an embodiment, the light-shielding property of the color mixing member is effectively used to repair the defective portion or the peripheral portion of the bank member. In the present invention, the BM is not especially limited to those having an arrangement pattern (planar shape) of matrix as long as it is a light-shielding member partitioning a plurality of colored layers. The BM may be formed in a stripe pattern, for example. The form of the bank member at least part of which is constituted by the BM is not especially limited. Examples thereof includes a single layer form in which the entire bank member is constituted by the BM, and a multi-layer form in which the lower part of the bank member is constituted by the BM and the upper part thereof is constituted by a non-shading member.

It is preferable that the defective portion of the bank member is a portion having a relatively thin film thickness of the bank member, a portion having a relatively thin width of the bank member, and/or a disconnection portion of the bank member. In such a form, generation of the color mixing defective pixels is effectively prevented. If the defective portion of the bank member is in such a form, the functional effects of the present invention can be obtained also by using a colored layer (one-color member formed of a colored layer material of one color) instead of the color mixing member with a light-shielding property. That is, the present invention is also a color filter substrate comprising a bank member and a colored layer on a substrate, wherein the color filter substrate has a structure in which the colored layer is formed in a defective portion of the bank member. The portion where the one-color member is formed is more preferably adjacent to a colored layer of the same color as that of the one-color member, and still more preferably is between colored layers of the same color as that of the one-color member. It is more preferable that the above-mentioned defective portion of the bank member is on a region light-shielded by another light-shielding member such as BM.

It is preferable that the color mixing member covers at least internal surface of the bank member surrounding the colored layer. The color mixing member in such an embodiment is formed by leaving the coloring mixing member formed in the outer edge of the colored layer (along the bank member) without being removed when the colored layers with a color mixing defect are corrected. As mentioned above, a new surface is formed by leaving the color mixing member in such a way that at least internal surface of the bank member is covered. As a result, the lyophilic and lyophobic properties of the bank surface surrounding the regions from which the color mixing member is removed by fluorine plasma treatment and the like can be controlled, which makes it possible to suppress the color mixing defect from being generated again when a liquid colored layer material is added dropwise into the color mixing member-removed region. The pixels corrected in such a manner are surrounded by the color mixing member, and therefore can be specified based on the area relatively smaller than that of another pixel of the same color formed in the CF substrate.

It is preferable that a width of the color mixing member covering the internal surface of the bank member varies depending on a color of an adjacent colored layer. According to this embodiment, the area of the light-shielding region is adjusted by the width of the color mixing member, and thereby a color filter substrate with high display quality, in which the area of the pixel region is adjusted for human visibility with respect to each color, can be provided.

It is preferable that a difference in light transmittance between a corrected pixel and a pixel having no color mixing defect and having the same color as a color of the corrected pixel is 20% or less. The difference is more preferably 17.5% or less. According to this embodiment, a color filter substrate with high display quality, in which the light transmittance of the colored layers over the entire surface is substantially uniformized with respect to each color, can be provided. The measurement method of the light transmittance is mentioned below.

It is preferable that the substrate has a region with a thickness thinner than a thickness in other pixels, inside at least one pixel adjacent to the color mixing member. It is preferable that the region is positioned at four corners of the pixel. The substrate in these embodiments is formed by removing the color mixing member by laser light irradiation and the like and simultaneously grinding the substrate surface when the colored layers with the color mixing defect are corrected. As mentioned above, a new substrate surface is exposed and thereby the lyophilicity in the regions from which the color mixing member is removed can be improved. In addition, generation of color void or light leakage at the corners of the pixel (corners of the bank member) can be suppressed when the colored layer is formed again in the color mixing member-removed regions. It is more preferable that the region is positioned at the entire outer edge of the pixel.

It is preferable that the colored layer is formed of a solidified ink. According to this embodiment, the colored layer can be easily formed in a high-definition pattern by an ink jet method. The solidified ink means a solid material obtained by drying and solidifying a liquid material (ink) which can be ejected by an ink jet device, such as a solid component dispersed into an ink (droplet) and a solid material dissolved in an ink (droplet), and deposited after solvent volatilization.

The present invention is also a liquid crystal display device comprising the color filter substrate. According to the present invention, a liquid crystal display device with high display quality, in which light leakage is sufficiently suppressed and the color mixing defective pixel is hardly included, can be produced with high yield.

The present invention is also a production method of a color filter substrate comprising a bank member and a colored layer on a substrate, wherein the bank member is corrected by forming a color mixing member formed of colored layer materials of two or more colors in a defective portion of the bank member or along the bank member. According to the present invention, the defective portion or the peripheral portion of the bank member can be repaired using the colored layer material, without additional preparing the material for correction. Therefore, the yield of the color filter substrate can be improved by the simple and inexpensive method.

In the production method of the color filter substrate according to the present invention, it is preferable that at least part of the bank member is constituted by a black matrix and the production method of the color filter substrate comprises a color mixing member-forming step of forming the color mixing member by adding droplets containing colored layer materials of two or more colors in a defective portion penetrating the black matrix. That is, the present invention is also production method of a color filter substrate comprising a bank member, at least part of the bank member being constituted by a black matrix (BM), and a colored layer on a substrate, wherein the production method of the color filter substrate comprises a color mixing member-forming step of forming the color mixing member by adding droplets containing colored layer materials of two or more colors in a defective portion penetrating the black matrix. According to such production method of the color filter substrate of the present invention, the defective portion (pin hole) penetrating the BM can be repaired by the simple and inexpensive method of adding dropwise the liquid colored layer material (ink). In this case, it is preferable that the production method of the color filter substrate comprises a step of subjecting a surface of the defective portion penetrating the black matrix to a lyophobic treatment before the color mixing member-forming step. According to this embodiment, the position at which the ink is added dropwise can be controlled with high accuracy, and therefore the repair can be performed with high accuracy in the color mixing member-forming step.

It is preferable that the production method of the color filter substrate comprises a color mixing member-removing step of removing the color mixing member in pixel regions with a color mixing defect. Examples of the embodiment in which the production method includes the color mixing member-removing step include an embodiment (A) in which at least part of the bank member is constituted by a black matrix, and the production method of the color filter substrate comprises the steps of: adding a colored layer material-containing droplet in each pixel region; and if the color mixing member is formed by generation of a color mixing defect in both adjacent pixel regions of the defective portion of the bank member, removing the color mixing member in the pixel regions except at least a portion alternatively used as the bank member. That is, the present invention is also a production method of a color filter substrate comprising a bank member, at least part of the bank member being constituted by a black matrix, and a colored layer on a substrate, wherein the production method of the color filter substrate comprises the steps of: adding a colored layer material-containing droplet in each pixel region; and if the color mixing member is formed by generation of a color mixing defect in both adjacent pixel regions of the defective portion of the bank member, removing the color mixing member in the pixel regions except at least a portion alternatively used as the bank member. According to the production method of the color filter substrate of the present invention, in the color mixing member-removing step (pixel-opening step), an unnecessary color mixing member is removed (color mixing defective pixels are opened) and simultaneously part of the color mixing member is used for correcting the defective portion of the bank member adjacent to the color mixing defective pixels. As a result, the bank member can be repaired simply and inexpensively. Examples of the above-mentioned portion of the color mixing member alternatively used as the bank member include the defective portion or the peripheral portion of the bank member.

Another embodiment in which the production method includes the color mixing member-removing step is, for example, an embodiment (B) in which at least part of the bank member is constituted by a black matrix and the production method of the color filter substrate comprises the steps of: if the defective portion of the bank member is detected, forming the color mixing member by causing a color mixing defect by adding a colored layer material-containing droplet in each pixel region, and further adding a droplet containing a colored layer material of a color different from a color of the colored layer material-containing droplet in at least one of both adjacent pixel regions of the defective portion of the bank member; and removing the color mixing member in the pixel regions except at least a portion alternatively used as the bank member. That is, the present invention is also a production method of a color filter substrate comprising a bank member, at least part of the bank member being a black matrix, and a colored layer on a substrate, wherein the production method of the color filter substrate comprises the steps of: if the defective portion of the bank member is detected, forming the color mixing member by causing a color mixing defect by adding a colored layer material-containing droplet in each pixel region, and further adding a droplet containing a colored layer material of a color different from a color of the colored layer material-containing droplet in at least one of both adjacent pixel regions of the defective portion of the bank member; and removing the color mixing member in the pixel regions except at least a portion alternatively used as the bank member. According to the production method of the color filter substrate of the present invention, in the color mixing member-removing step (pixel-opening step), an unnecessary color mixing member is removed (color mixing defective pixels are opened) and simultaneously part of the color mixing member is used for correcting the defective portion of the bank member adjacent to the color mixing defective pixels. The bank member can be repaired simply and inexpensively. The combination of the colors of the liquid colored layer materials (inks) added dropwise in the both adjacent pixel regions of the defective portion of the bank member is not especially limited as long as the combination causes the color mixing and the number of the colors is 2 or more.

The present invention is also a production method of a color filter substrate comprising a bank member, at least part of the bank member being constituted by a black matrix, and a colored layer on a substrate, wherein the production method of the color filter substrate comprises: if a defective portion of the bank member is detected, a step of adding a colored layer material-containing droplet of one color in both adjacent pixel regions of the defective portion of the bank member; and a colored layer-removing step of removing a colored layer in one of the both adjacent pixel regions of the defective portion of the bank member except a portion formed in the other of the both adjacent pixel regions and a portion alternatively used as the bank member. According to the production method of the color filter substrate of the present invention, part of the both adjacent pixel regions of the defective portion of the bank member and the colored layer (one-color member) formed in the defective portion of the bank member are used for correcting the defective portion of the bank member. The bank member can be repaired simply and inexpensively. In the colored layer (one-color member) -removing step, of the both adjacent pixel regions of the defective portion of the bank member, the one-color member is removed (the pixel is opened) in the pixel region where the one-color member of a color different from a designed color is formed, and in the pixel region where the one-color member of a designed color is formed, the one-color member is left to be used as the colored layer.

It is preferable that the defective portion of the bank is a portion having an insufficient film thickness, a portion having an insufficient width, and/or a disconnection portion. Existence of these various defective portions of the bank member causes the color mixing defective pixels. However, in the present invention, the color mixing member formed of the colored layer materials or the one-color member (colored layer) is used as an alternative for the defective portion of the bank member, and thereby the correction of the bank member and the opening of the color mixing defective pixels can be performed simply and inexpensively. Therefore, a color filter substrate hardly including the color mixing defective pixels can be produced.

Another embodiment in which the production method includes the color mixing member-removing step is, for example, an embodiment (C) at least part of the bank member is constituted by a black matrix and the production method of the color filter substrate comprises the steps of: adding a colored layer material-containing droplet in each pixel region; and if the color mixing member is formed by generation of color mixing defective pixels, removing the color mixing member in the pixel regions except the color mixing member in an outer edge of the color mixing defective pixels. That is, the present invention is also a production method of a color filter substrate comprising a bank member, at least part of the bank member being constituted by a black matrix, and a colored layer on a substrate, wherein the production method of the color filter substrate comprises the steps of: adding a colored layer material-containing droplet in each pixel region; and if the color mixing member is formed by generation of color mixing defective pixels, removing the color mixing member in the pixel regions except the color mixing member in an outer edge of the color mixing defective pixels. According to the production method of the color filter substrate of the present invention, the color mixing member left in the outer edge of the color mixing pixels (along the bank member) forms a new surface. As a result, the lyophilic and lyophobic properties of the bank surface surrounding the regions from which the color mixing member is removed can be controlled by fluorine plasma treatment and the like, which makes it possible to suppress the color mixing defect from being generated again when a liquid colored layer material is added dropwise into the color-mixing member-removed regions. In addition, light leakage at the outer edge of the pixel (along the bank member) can be suppressed because the color mixing member has a light-shielding property.

It is preferable that in the color mixing member-removing step, an area removed is varied depending on a color of a colored layer formed in the pixel regions after the color mixing member is removed. According to this method, a color filter substrate with high display quality, in which the area of the pixel region is adjusted for human visibility with respect to each color, can be provided.

It is preferable that a colored layer is formed in the pixel regions after the color mixing member is removed in such a way that a difference in light transmittance between a color mixing defect-corrected pixel and a pixel with no color mixing defect is 20% or less. According to this method, even if both of the pixel not provided with the correction and the pixel provided with the correction exist on the substrate, the difference in light transmittance between the both pixels is small enough. Therefore, a color filter substrate with high display quality can be produced. The difference in light transmittance is more preferably 17.5% or less. The measurement method of the light transmittance is mentioned below.

It is preferable that the production method of the color filter substrate comprises a step of subjecting the color mixing member left in an outer edge of the pixel regions after the color mixing member is removed to a lyophobic treatment. According to this method, accuracy of addition of the colored layer material-containing droplet (ink) when the pixel regions after the color mixing member is removed are colored again, can be improved. The above-mentioned lyophobic treatment is not especially limited, and plasma treatments such as fluorine plasma treatment are preferable.

It is preferable in the above-mentioned production method of the color filter substrate that (1) the color mixing member-removing step or the colored layer-removing step is performed using laser light having a wavelength substantially not absorbed by the substrate, and the production method comprises a step of subjecting a region after the color mixing member is removed or a region after the colored layer is removed to a lyophilic treatment. According to this method, the substrate surface in the regions from which the color mixing member is removed (in the opened pixel regions) is provided with lyophilicity through the lyophilic treatment step. As a result, the colored layer material-containing droplet (ink) spreads over the entire opened region when the pixel regions are colored again, and thereby light leakage is reduced. The lyophilic treatment is not especially limited, and ashing, ultraviolet irradiation and the like are preferable.

It is preferable that the production method (1) comprises a step of irradiating the region after the color mixing member is removed or the region after the colored layer is removed, with laser light having a wavelength longer than the wavelength of the laser light used in the color mixing member-removing step or the colored layer-removing step. According to this method, dusts generated in the color mixing member-removing step can be removed, and therefore effects of the surface treatment can be enhanced. It is preferable that the laser light radiated for the dust removal has a wavelength within an optical range.

It is preferable that the production method (1) comprises an ultraviolet laser light-irradiating step of irradiating the region after the color mixing member is removed or the region after the colored layer is removed, with ultraviolet laser light. According to this method, a substrate absorbing ultraviolet laser light, such as a glass substrate, is irradiated with such laser light, and thereby dusts can be removed and simultaneously the substrate surface is slightly ground and the substrate surface in the color mixing member-removed (opened) regions can be provided with lyophilicity. It is preferable that the ultraviolet laser light-irradiating step is performed for four corners of the region after the color mixing member is removed or the region after the colored layer is removed. According to this method, the colored layer material-containing droplet (ink) can sufficiently spread into the four corners of the opened region when the pixel region is colored again, and thereby light leakage can be suppressed.

It is preferable in the above-mentioned production method of the color filter substrate that (2) the color mixing member-removing step or the colored layer-removing step is performed using laser light having a wavelength absorbed by the substrate. According to this method, the color mixing member is removed and simultaneously the substrate surface is slightly ground in the color mixing member-removed step. As a result, the color mixing member-removed (opened) regions can be provided with lyophilicity.

It is preferable in the above-mentioned production method of the color filter substrate that the colored layer material-containing droplet is added using an ink jet device. According to this method, use of the ink jet device makes it possible to fine adjust the addition amount of the droplet and add such a droplet with high accuracy. Therefore, high definition of the color filter substrate, reduction of the colored layer material, and improvement in production yield can be enhanced.

It is preferable that the production method of the color filter substrate comprises a step of grinding the color mixing member or the colored layer formed on the bank member. Thus, the grinding step is performed if the color mixing member or the colored layer on the bank has a too large film thickness. As a result, variation in cell thickness is suppressed when the color filter substrate is mounted on a liquid crystal display panel and the like.

The present invention is also a production method of a liquid crystal display device, employing the production method of the color filter substrate. According to such a production method of the liquid crystal display device of the present invention, the production method of the color filter substrate of the present invention is employed, and therefore the yield or the display quality can be improved simply and inexpensively.

EFFECT OF THE INVENTION

According to the color filter substrate of the present invention, the color mixing member formed of colored layer materials of two or more colors or the colored layer material (one color material) is used as a member for repairing the defective portion of the bank member or a surface layer of the bank member. As a result, there is no need to additionally prepare a material for correction, and therefore, a color filter substrate in which the defective portion of the bank member or the color mixing defect of the colored layer is corrected can be provided by the simple and inexpensive method.

BEST MODES FOR CARRYING OUT THE INVENTION

The present invention is mentioned below in more detail with reference to Embodiments, using drawings, but the present invention is not limited to these Embodiments.
"Correction of Light-Shielding Layer Using Color Mixing Member"

EMBODIMENT 1

Correction of Pin Hole

FIG. 1 is a chart showing one example of a step flow of correction of a pin hole formed in a black matrix (BM), in production steps of a color filter (CF) substrate. FIGS. 2 (*a*) to (*c*) are planar views schematically showing one example of the step flow of correction of a pin hole formed in a BM. FIGS. 3 (*a*) to (*c*) are cross-sectional views schematically showing the CF substrates shown in FIGS. 2 (*a*) to (*c*) taken along line A-B, respectively.

The present Embodiment shows a step of correcting a pin hole (through-hole) 12 shown in FIGS. 2 (*a*) and 3 (*a*), the pin hole 12 being detected in a pattern examination step (FIG. 1 (*ii*)) of a BM 11 formed on a glass substrate 10 using a resin material (FIG. 1 (*i*)).

First, after the pattern examination step, a plasma treatment was performed under atmospheric pressure using carbon tetrafluoride ($CF_4$) as an introduced gas (FIG. 1 (*iii*)). The purpose of this treatment is that the lyophobicity of the BM 11 around the pin hole 12 is enhanced and thereby an ink added dropwise by ink ejection performed later is kept inside the pin hole 12. The substrate surface inside the pin hole 12 may be subjected to a lyophilic treatment using excimer ultraviolet (UV) laser before the plasma treatment. However, insufficient lyophilicity may be exhibited due to influence of residues and the like. The pin hole 12 is thought to be almost as large as the droplet added. Therefore, the inside of the pin hole does not necessarily have lyophilicity. In the present Embodiment, the lyophilic treatment was not performed and only the fluorine plasma treatment was performed, thereby providing the entire surface of the pinhole 12 with lyophobicity. Then, inks having the same component as that of inks used for forming each colored layer were ejected into the pin hole 12 using an ink jet printing device, in order of R (red), G (green), and B (blue). As a result, a color mixing ink 13 was formed inside the pin hole 12 as shown in FIGS. 2 (*b*) and 3 (*b*) (FIG. 1 (*iv*)). Finally, the color mixing ink 13 was dried and polymerized by calcination at 80° C. for 30 minutes and at 24° C. for 30 minutes (FIG. 1 (*v*)). A color mixing layer (color mixing member) 14 with a sufficient light-shielding property was formed inside the pin hole 12. As a result, the correction of the pin hole 12 was completed. Through such a correction step flow, the pin hole 12 formed in the BM 11 could be corrected simply and inexpensively.

The combination of the colors of the inks mixed inside the pin hole is not especially limited, and the combination of cyan (C), yellow (Y), and magenta (M) and the like, or other combinations of three colors may be applied. It is sufficient that the inks of two or more colors may be charged into the pin hole, and inks of two colors such as a combination of R and G or G and R may be charged. Even if the inks of two colors are mixed, selection of the combination of proper colors makes it possible to form a color mixing layer with a sufficient light-shielding property inside the pin hole. The ejection order of the inks is not especially limited, and a previously mixed ink may be used.

The compositions of the inks for colored layer formation of each color used in Embodiment 1 are mentioned below. The compositions of the inks for colored layer formation of each color are not limited to those mentioned below.
(Composition of Red Ink for Colored Layer Formation)
Pigment (C.I. pigment red 254): 5 parts by weight
Polymer dispersant (product of AVECIA Ltd., Solspurse 24000):
2 parts by weight
Binder (benzyl methacrylate-methacrylic acid copolymer): 3 parts by weight
Monomer 1 (dipentaerythritol pentaacrylate): 2 parts by weight
Monomer 2 (tripropylene glycol diacrylate): 5 parts by weight
Initiator (2-methyl-1-[4-(methylthio)phenyl]-2-monopholino propane)-1-one): 2 parts by weight
Solvent (diethylene glycol monobutyl ether acetate, 29.9 dyn/cm): 81 parts by weight
(Composition of Blue Ink for Colored Layer Formation)
The blue ink has the same composition as that of the red ink for colored layer formation except that the blue ink contains 5 parts by weight of C.I. pigment blue 15:6 as a pigment, instead of the C.I. pigment red 254.
(Composition of Green Ink for Colored Layer Formation)
The green ink has the same composition as that of the red ink for colored layer formation except that the green ink contains 5 parts by weight of the C.I. pigment green 36 as a pigment, instead of C.I. pigment red 254.
"Correction of Bank Member Using Color Mixing Member"

EMBODIMENT 2

Correction of BM (Bank Member) Having Insufficient Film Thickness

FIG. 4 is a chart showing one example of a step flow of correction of a defective portion of a BM in production steps of a color filter (CF) substrate. FIGS. 5 (*a*) to (*c*) are planar views schematically showing one example of a step flow of correction of a BM having an insufficient film thickness. FIGS. 6 (*a*) to (*c*) are cross-sectional views schematically showing the CF substrates shown in FIGS. 5 (*a*) to (*c*) taken along line C-D, respectively.

As shown in FIGS. 5 (*a*) and 6 (*a*), a BM (bank member) 11 was formed on a glass substrate 10 using a resin material, and then the BM 11 surface was provided with lyophobicity by fluorine plasma treatment (FIGS. 4 (*i*) to (*iii*)). Then, each pixel region was colored using an ink jet printing device (FIG. 4 (*iv*)), and then the ink ejected on each pixel region was dried and polymerized by calcination at 80° C. for 30 minutes and at 24° C. for 30 minutes (FIG. 4 (*v*)). Then, each pixel was observed in the color examination step (FIG. 4 (*vi*)) and color mixing regions shown in FIGS. 5 (*b*) and 6 (*b*) were detected. A color mixing layer (color mixing member) 14 inside the pixels, except a portion on the BM 11, was irradiated with the second higher harmonic of yttrium aluminum garnet (YAG) pulsed laser (wavelength: 532 nm) As a result, the pixel regions with the color mixing defect were opened as shown in FIGS. 5 (*c*) and 6 (*c*) (FIG. 4 (*vii*)). In order to provide the surface of the BM 11 and the color mixing layer 14 left on the BM 11 with lyophobicity, a process for forming colored layers, such as another fluorine plasma treatment, was performed, and thereby a CF substrate free from color mixing defects could be prepared (FIGS. 4 (*viii*) to (*xi*)). Through such a correction step flow, the portion having an insufficient film thickness of the BM (the portion having a relatively thin film thickness of the bank member) could be corrected simply and inexpensively.

EMBODIMENT 3

Correction of BM Having Disconnection Defect

FIGS. 7 (*a*) to (*c*) are planar views schematically showing one example of a step flow of correction of a BM having a disconnection defect. FIGS. 8 (*a*) to (*c*) are cross-sectional views schematically showing the CF substrates shown in FIGS. 7 (*a*) to (*c*) taken along line E-F, respectively.

A BM (bank member) 11 was formed on a glass substrate 10 using a resin material, and then in the pattern examination step, a disconnection defect shown in FIGS. 7 (*a*) and 8 (*a*) was detected (FIGS. 4 (*i*) and (*ii*)). Then, the color layer-forming process was performed as in Embodiment 2 (FIGS. 4 (*iii*) to (*v*)), and in the color examination step (FIG. 4 (*vi*)), each pixel was observed, and then generation of a color mixing defect was found at the disconnection defect portion of the BM 11, as shown in FIGS. 7 (*b*) and 8 (*b*). As shown in FIGS. 7 (*c*) and 8 (*c*), a color mixing layer (color mixing member) 14 formed at the disconnection defect portion of the BM 11 was left as an alternative for the BM 11, and the color mixing layer 14 inside the pixels was removed using the second higher harmonic of yttrium aluminum garnet (YAG) pulsed laser (wavelength: 532 nm). As a result, the pixel regions with the color mixing defect were opened (FIG. 4 (*vii*)). In order to provide the surface of the BM 11 and the color mixing layer 14 used as an alternative for the BM 11 with lyophobicity, a process for forming colored layers, such as another fluorine plasma treatment, was performed, and thereby a CF substrate free from disconnection defects in the BM could be prepared (FIGS. 4 (*viii*) to (*xi*)). Through such a correction step flow, the disconnection portion of the BM (the disconnection portion of the bank member) could be corrected simply and inexpensively.

In the present Embodiment, the disconnection defect is detected in the pattern examination step (FIG. 4 (*ii*)) after the BM 11 formation. Therefore, in the first ink ejection step (FIG. 4 (*iv*)), it is sufficient that at least pixel regions adjacent to the bank member including the disconnection defect portion are colored, and there is no need to color all the pixel regions. If the disconnection defect is detected in the pattern examination step (FIG. 4 (*ii*)) as in the present Embodiment, inks of different colors may be intentionally ejected additionally in the pixel regions for which the color mixing defect is caused, in the first ink ejection step (FIG. 4 (*iv*)). The combination of the colors of the inks used for forming the color mixing layer 14 is not especially limited as long as the color mixing is caused.

EMBODIMENT 4

Correction of BM Having Thin Line Defect

FIGS. 9 (*a*) to (*c*) are planar views schematically showing one example of a step flow of correction of a BM having a thin line defect. FIGS. 10 (*a*) to (*c*) are cross-sectional views schematically showing the CF substrates shown in FIGS. 9 (*a*) to (*c*) taken along line G-H, respectively.

A BM (bank member) 11 was formed on a glass substrate 10 using a resin material, and then in the pattern examination step, a thin line defect shown in FIGS. 9 (*a*) and 10 (*a*) was detected (FIGS. 4 (*i*) and (*ii*)). Then, the colored layer-forming process (FIGS. 4 (*iii*) to (*v*)) was performed as in Embodiment 2, and in the color examination step, each pixel was observed and then generation of a color mixing defect was found at a thin line defect portion of the BM 11, as shown in FIGS. 9 (*b*) and 10 (*b*) (FIG. 4 (*vi*)). As shown in FIGS. 9 (*c*) and 10 (*c*), a color mixing layer (color mixing member) 14 formed at the thin line portion of the BM 11 was left as an alternative for the BM 11, and the color mixing layer 14 inside the pixels was removed using the second higher harmonic of yttrium aluminum garnet (YAG) pulsed laser (wavelength: 532 nm). As a result, the pixel regions with the color mixing defect were opened (FIG. 4 (*vii*)). In order to provide the surface of the BM 11 and the color mixing layer 14 left as an alternative for the BM 11 with lyophobicity, a process for forming colored layers, such as another fluorine plasma treatment, was performed, and thereby a CF substrate free from color mixing defects could be prepared (FIG. 4 (*viii*) to (*xi*)). Through such a correction step flow, the portion having an insufficient width of the BM (the portion having a relatively thin width) could be corrected simply and inexpensively.

EMBODIMENT 5

Thinning of Color Mixing Layer Formed on BM

FIGS. 11 (*a*) to (*c*) and FIGS. 12 (*a*) to (*c*) are each cross-sectional views schematically showing a step flow of thinning a color mixing layer formed on a BM in production steps of a color filter (CF) substrate.

As shown in FIGS. 11 (*a*) and 12 (*a*), a color mixing layer (color mixing member) 14 is formed on a BM between pixels with a color mixing defect caused by error of dropwise addition or generation of satellite in an ink jet method. If the color mixing layer 14 formed on the BM 11 has a large film thickness, a cell thickness defect is caused, possibly generating display defects. Therefore, the color mixing layer 14 needs to be thinned in some cases. In the present Embodiment, two ways (I) and (II) of thinning the color mixing layer on the BM 11 between the pixels with the color mixing defect are mentioned.

(I) Thinning of Color Mixing Layer on BM→Removal of Color Mixing Layer Inside Pixel First, the color mixing layer 14 on the BM 11 was thinned by a grinding device as shown in FIG. 11 (*b*). Then, the color mixing layer 14 inside the pixels was removed using the second higher harmonic of yttrium aluminum garnet (YAG) pulsed laser (wavelength: 532 nm), as shown in FIG. 11 (*c*), and thereby the pixel regions with the color mixing defect were opened. As a result, a corrected BM-including substrate which used the color mixing layer 14 as an alternative for the BM 11 and was free from cell thickness defects was completed. In this method, the color mixing layer 14 is partly removed by laser ablation in the step of opening the pixels with the color mixing defect by laser light. The step of opening the inside of the pixels is performed after the grind, and thereby some dusts generated in the grinding step can be removed.

(II) Removal of Color Mixing Layer Inside Pixels→Thinning of Color Mixing Layer on BM (FIGS. 12 (*a*) to (*c*))

First, as shown in FIG. 12 (*b*), the color mixing layer 14 inside the pixels with the color mixing defect was removed using the second higher harmonic of yttrium aluminum garnet (YAG) pulsed laser (wavelength: 532 nm), and thereby the pixel regions with the color mixing defect were opened. Then, as shown in FIG. 12 (*c*), the same laser at a smaller intensity was radiated to the upper surface of the color mixing layer 14 on the BM 11, and thereby the color mixing layer 14 was thinned. As a result, a corrected BM-including substrate which used the color mixing layer 14 as an alternative for the BM 11 and was free from cell thickness defects was completed. In this method, the color mixing layer 14 is thinned using laser light, and therefore generation of dusts can be suppressed in comparison to the thinning using the grinding device.

"Correction of Color Mixing Defective Pixel Using Color Mixing Layer"

EMBODIMENT 6

FIGS. 13 (*a*) to (*d*) are cross-sectional views schematically showing one example of a step flow of correction of color mixing defective pixels using a color mixing layer in production steps of a color filter (CF) substrate. FIGS. 14 (*a*) to (*d*) are cross-sectional views schematically showing the CF substrates shown in FIGS. 13 (*a*) to (*d*) taken along line I-J, respectively. FIGS. 14 (*e*) and (*f*) are cross-sectional views each showing the CF substrate 14 (*d*) after the color mixing layer is thinned.

As shown in FIGS. 13 (*a*) and 14 (*a*), a BM (bank member) 11 was formed on a glass substrate 10 using a resin material, and then a colored layer-forming process was performed as in Embodiment 2. Then, in the color examination step, each pixel was observed, and then a color mixing region shown in FIGS. 13 (*b*) and 14 (*n*) was detected. In the present Embodiment, a position coordinate of the color mixing defect identified in the color examination step was shared between a laser correction device and an ink jet printing device, and then the pixels were corrected. The correction step flow is mentioned below in more detail.

First, as shown in FIGS. 13 (*c*) and 14 (*c*), the pixels with the color mixing defect were irradiated with the second higher harmonic of yttrium aluminum garnet (YAG) pulsed laser (wavelength: 532 nm) except the color mixing layer (color mixing member) 14 around the pixels, and thereby part of the pixels was opened. The area to be opened varies depending on the shape of the BM 11 or the size of the pixel. Therefore, the opening was performed after the opened area was previously identified and stored in the laser correction device. Then, the opened regions were subjected to ashing for 15 seconds to exhibit lyophilicity for an ink material to be colored. Then, the color mixing layer 14 left along the BM 11 was subjected to plasma treatment for 30 seconds using carbon tetrafluoride ($CF_4$) as an introduced gas to be provided with lyophobicity. Through the above-mentioned treatment, a contact angle of the ink to the substrate surface could be 20° or less (lyophilicity) and a contact angle of the ink to the color mixing layer 14 surface could be 50° or more (lyophobicity).

It is preferable in terms of the lyophobicity that a contact angle of the ink to the color mixing layer 14 surface is 45° or more.

As shown in FIGS. 13 (*d*) and 14 (*d*), the opened regions were colored using the ink jet printing device. The case where the opened regions are colored with blue (B) is mentioned. The film thickness of the pixel is generally set to be 1.85 μm. The film thickness of the corrected pixel was determined to be 1.55 μm so that a difference in transmittance between the normal pixel and the corrected pixel |ΔY| satisfied |ΔY|≦2.0 if the opening ratio was substantially 80%. Accordingly, in the present Embodiment, the difference in transmittance between the normal pixel and the corrected pixel was less than 20%. This difference in transmittance was determined so as to be within a range where the difference is hardly recognized, by performing evaluation by eye observation under various conditions of the opening ratio and the colored film thickness, based on a standard film thickness. The conditions for forming the corrected pixel are differentially determined for each color. The opening ratio varies depending on the size of the pixel. However, the film thickness of the corrected pixel is determined on the assumption that the opening ratio is 70 to 90%, generally. The opening ratio may vary depending on visibility, transmittance and the like, among colors. If blue (B) and red (R) causes a color mixing defect, red (R) has an opening ratio larger than that of blue (B) because red (R) normally has a higher transmittance. In the present Embodiment, the opening ratio of red (R) is determined to be substantially 85%, although the opening ratio of blue (B) is determined to be substantially 80%. As a result, a difference in color between the corrected pixel and the normal pixel with respect to red (R) could be improved.

The procedures of the transmittance measurement of the pixel are as follows.

"Transmission Spectrometry"

1) A plurality of light sources corresponding to a wavelength of light to be measured are used, and light emitted from the light sources is dispersed by a method using a diffraction grating or another method.

2) The dispersed light is made incident into a sample, and the transmitted light on the sample surface is measured for intensity at each wavelength if the intensity of the light when not transmitted into the sample is defined as 100%.

3) The color characteristics are calculated only within an optical light (380 to 780 nm: JIS-Z-8701).

"Principle of Color Characteristics Analysis"

The color characteristics are calculated in accordance with the method described in JIS-Z-8701 using the data of the transmittance at each wavelength obtained by the measurement using a spectrophotometer.

1) Using spectrum tristimulus values for each standard light source (coefficients of three colors of blue (z), green (y), and red (x)), the coefficient of the transmittance at each wavelength is multiplied. First, the tristimulus values of a light source color are determined as mentioned below.

[Formula 1]
$$X = k \int_{380}^{780} P(\lambda)x(\lambda)d\lambda \quad (1)$$

[Formula 1]
$$Y = k \int_{380}^{780} P(\lambda)y(\lambda)d\lambda \quad (2)$$

[Formula 3]
$$Z = k \int_{380}^{780} P(\lambda)z(\lambda)d\lambda \quad (3)$$

P (λ) is a spectral distribution of a light source, and each of x (λ), y (λ), and z (λ) is a color-matching function based on 2° visual field XYZ system. And k is a coefficient determined in such a way that the value of the stimulus value Y corresponds to the measurement value. Then, the tristimulus values of a transmittance color are determined.

[Formula 4]
$$X = K \int_{380}^{780} P(\lambda)x(\lambda)\tau(\lambda)d\lambda \quad (4)$$

[Formula 5]
$$Y = K \int_{380}^{780} P(\lambda)y(\lambda)\tau(\lambda)d\lambda \quad (5)$$

[Formula 6]
$$Z = K \int_{380}^{780} P(\lambda)z(\lambda)\tau(\lambda)d\lambda \quad (6)$$

K in the above-mentioned formulae (4) to (6) is shown by the following formula.

[Formula 7]
$$K = 100 \Big/ \int_{380}^{780} P(\lambda)y(\lambda)d\lambda \quad (7)$$

The foregoing is based on CIE 1931 calorimetric system, and color-matching functions based on 2° visual field XYZ system are used. In the present Embodiment, a light source at a color temperature of 12000 K was used. The brightness of the transmittance color is shown by Y of the tristimulus values.

In the present Embodiment, coloring of each color was performed so that a difference in transmittance between the pixel with no color mixing defect and the color mixing defect-corrected pixel was 20% or less. In the color calculation, the color mixing member left around the color mixing defective pixel was defined as a light-shielding part, and the opening ratio and the preset film thickness were determined so that the corrected pixel has a transmittance (the transmittance of the region opened with laser and re-colored and the transmittance of the color mixing member left in the outer edge of the pixel: the transmittance of the entire pixel) of 80% or more relative to the transmittance of the normal pixel. The opening ratio needs to be as large as possible in order to reduce the color difference between the normal pixel and the corrected pixel. The portion left in the outer edge of the pixel hardly serves as a perfect light-shielding part in the color mixing defective pixel, actually. The portion partly includes a region with color mixing (color mixing member region), and also includes a region with no color mixing (one-color member region), generally. Therefore, it can be possible to reduce the color difference between the normal pixel and the corrected pixel as much as possible.

Then, the ink was dried by calcination at 80° C. for 30 minutes and at 240° C. for 60 minutes using a hot plate. Then, the film thickness was measured in the color examination step, and then the color mixing layer 14 on the BM 11 between the corrected pixels was subjected to a grinding treatment so that the cell thickness defect was not caused (FIGS. 14 (e) and (f)). It is sufficient that the grinding for this color mixing layer 14 is performed without causing the cell thickness defect. The entire color mixing layer 14 is not necessarily ground, and the grinding treatment may not be performed if not needed. Finally, washing (including brush washing and the like) was performed to remove dusts generated during the opening step and the grinding step using laser light. As a result, the pixels with the color mixing defect were corrected, and the color filter (CF) substrate was corrected.

EMBODIMENT 7

Opening Treatment Using Ultraviolet Laser Light

FIGS. 15 (a) to (d) are cross-sectional views schematically showing a step flow of correction of color mixing defective pixels using ultraviolet laser light in a step of opening the color defective pixels.

In the present Embodiment, the case where ultraviolet laser light absorbed within an absorption band of glass (substrate) is used to open pixel regions with a color mixing defect shown in FIG. 15 (a) is mentioned. The color mixing layer (color mixing member) 14 is effectively removed by laser ablation of ultraviolet laser light, and residues on the surface, which can be removed by optical laser light, can be removed. The glass surface is slightly ground depending on the laser intensity, as shown in FIG. 15 (b), and therefore there is no need to provide the opening region with lyophilicity. The correction step flow is mentioned below in more detail.

First, as shown in FIG. 15 (b), the pixels with the color mixing defect were irradiated with the fourth higher harmonic of yttrium aluminum garnet (YAG) pulsed laser (wavelength: 266 nm) except the color mixing layer 14 around the pixels, and thereby part inside the pixels was opened. At this time, the region opened was blackened due to influence of dusts generated when another region was opened. Therefore, the surface dusts need to be removed using laser light which has a spot diameter equivalent or larger than that of the laser light used for the opening and has a wavelength equivalent or larger than that of the laser light used for the opening. In the present Embodiment, the treatment was performed again using the second higher harmonic of YAG pulsed laser (wavelength: 532 nm). Then, washing was performed to remove dusts which scattered at the time of the laser opening. In the present Embodiment, brush washing was also performed to remove the dusts. Then, the surface of the color mixing layer 14 left around the pixels in the above-mentioned laser opening was provided with lyophobicity by fluorine plasma treatment. At this time, the dusts were removed in the above-mentioned washing step, and therefore, a sufficient lyophobicity property could be provided. Then, the colored layer-forming process was performed as in Embodiment 2, and the CF substrate was corrected (FIG. 15 (c)). Then, the step of thinning the color mixing layer 14 on the BM may be performed for preventing the cell thickness defect (FIG. 15 (d)), as in Embodiment 5.

EMBODIMENT 8

Opening Treatment Using Optical Laser and Lyophilic Treatment Using Ultraviolet Laser Light FIGS. 16 (a) to (d) are cross-sectional views schematically showing one example of a correction step flow of providing the opened region formed after the color mixing defective pixels are opened, with lyophilicity using ultraviolet laser light. In the present Embodiment, a lyophilicity treatment after the laser opening, using the second higher harmonic of yttrium aluminum garnet (YAG) pulsed laser (wavelength: 532 nm), is mentioned.

Pixels with a color mixing defect shown in FIG. 16 (a) are opened except a color mixing layer (color mixing member) 14 around the pixels. After that, fluorine plasma treatment is performed and thereby the colored layer 14 around the pixels can serve as a lyophobic bank. However, if the opening region has too high lyophobicity, light leakage is caused around the opened region after coloring. Therefore, the periphery of the opened region needs to have lyophilicity. Accordingly, in the present Embodiment, the periphery of the opened region was irradiated with the fourth higher harmonic of YAG pulsed laser (wavelength: 266 nm) to remove residues around the opened region. Then, fluorine-plasma treatment was performed so that the periphery of the opened region does not exhibit high lyophobicity (FIG. 16 (b)). As a result, the periphery of the opened region has lyophilicity and light leakage is improved. The following colored layer-forming process and the like are the same as those in Embodiment 7 (FIGS. 16 (c) and (d)).

This Nonprovisional application claims priority under 35 U.S.C. §119(a) on Patent Application No. 2004-285076 filed in Japan on Sep. 29, 2004, the entire contents of which are hereby incorporated by reference.

BRIEF DESCRIPTION OF DRAWINGS

FIGS. 14 (e) and (f) are cross-sectional views each showing the CF substrate 14 (d) after the color mixing layer is thinned.

EXPLANATION OF NUMERALS AND SYMBOLS

Figure 1:
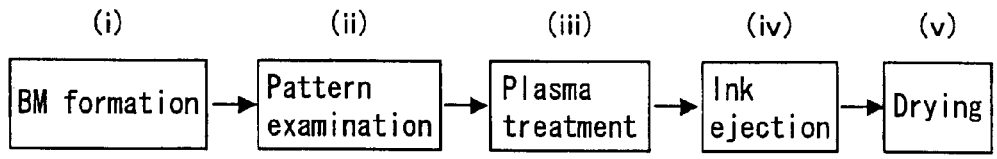
FIG. 1 is a chart showing one example of a step flow of correction of a pin hole formed in a black matrix (BM) in production steps of a color filter (CF) substrate.
Figure 2:
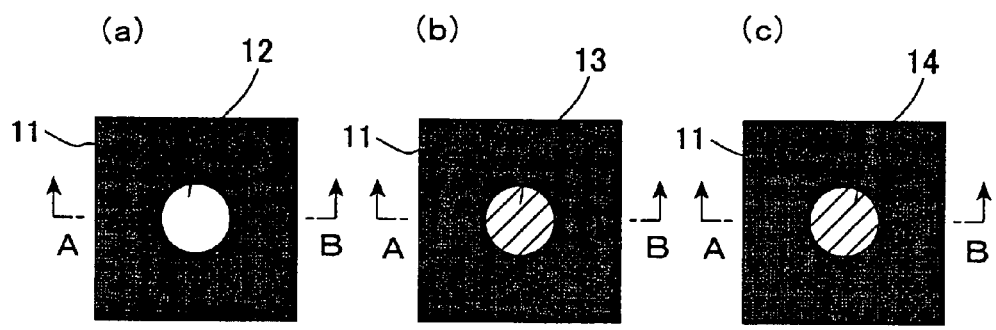
FIGS. 2 (a) to (c) are planar views showing one example of a step flow of correction of a pin hole formed in a BM.
Figure 3:
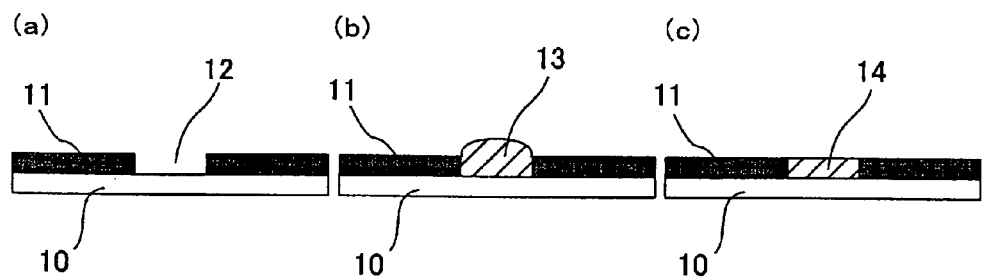
FIGS. 3 (a) to (c) are cross-sectional views schematically showing the CF substrates shown in FIGS. 2 (a) to (c) taken along line A-B.
Figure 4:
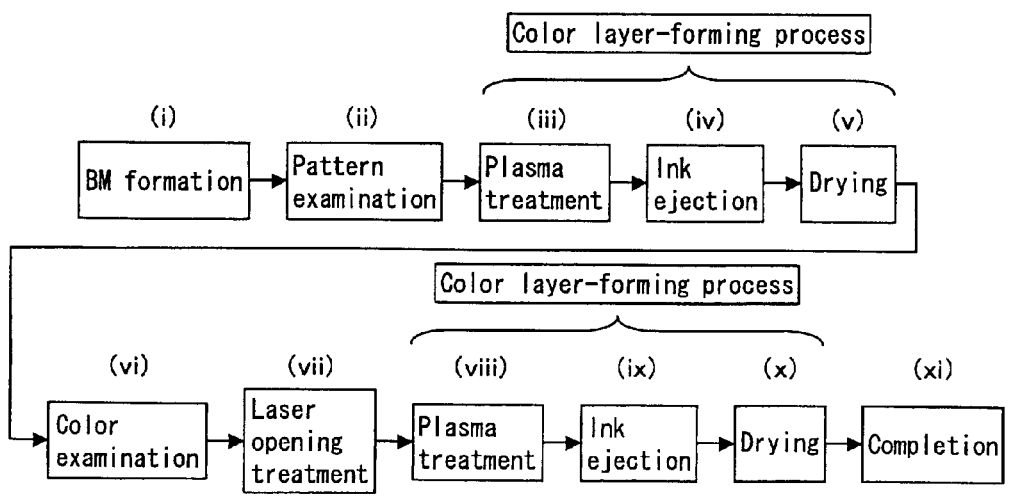
FIG. 4 is a chart showing a step flow of correction of a defective portion of a BM in production steps of a color filter (CF) substrate.
Figure 5:
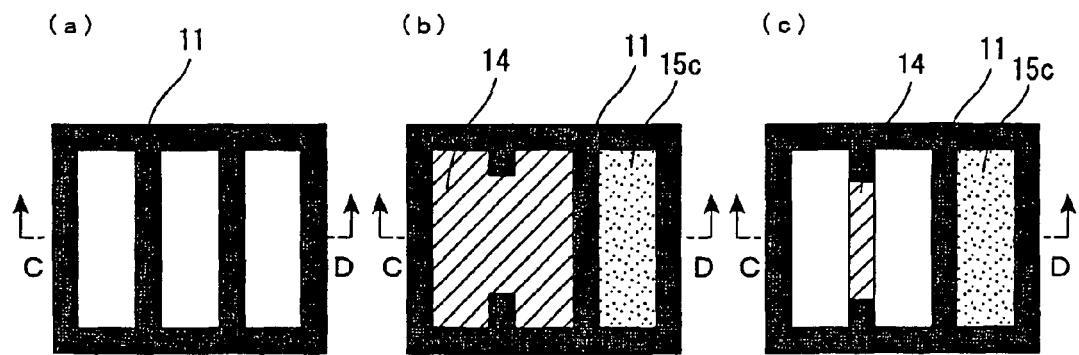
FIGS. 5 (a) to (c) are planar views schematically showing one example of a step flow of correction of a BM having an insufficient film thickness in production steps of a CF substrate.
Figure 6:
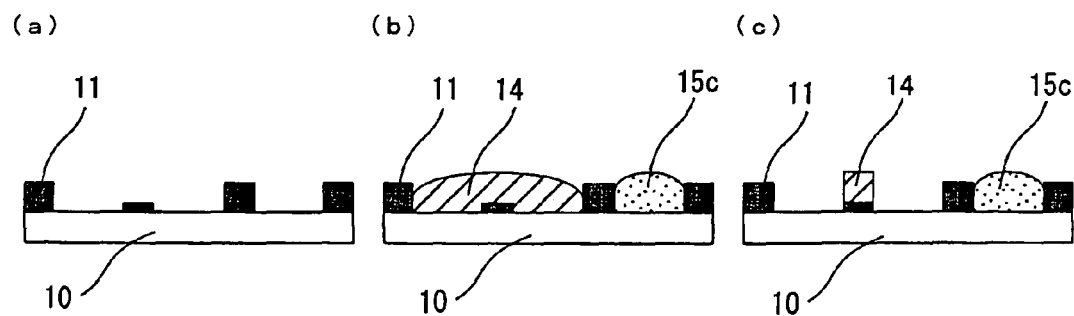
FIGS. 6 (a) to (c) are cross-sectional views schematically showing the CF substrates shown in FIGS. 5 (a) to (c) taken along line C-D.
Figure 7:
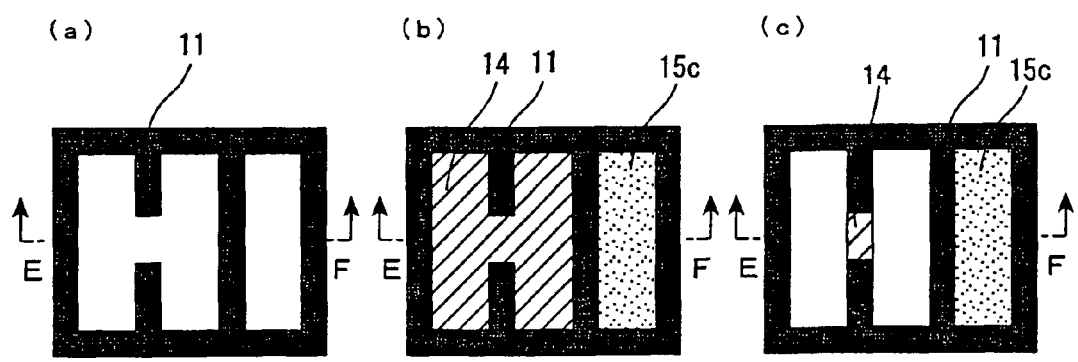
FIGS. 7 (a) to (c) are planar views schematically showing one example of a step flow of correction of a BM having a disconnection defect.
Figure 8:
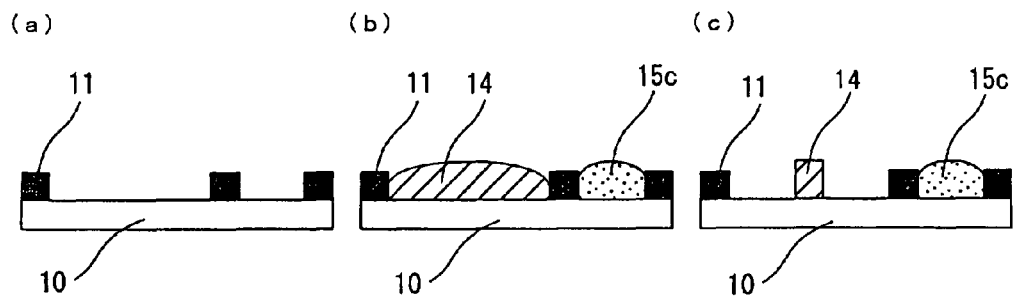
FIGS. 8 (a) to (c) are cross-sectional views schematically showing the CF substrates shown in FIGS. 7 (a) to (c) taken along line E-F.
Figure 9:
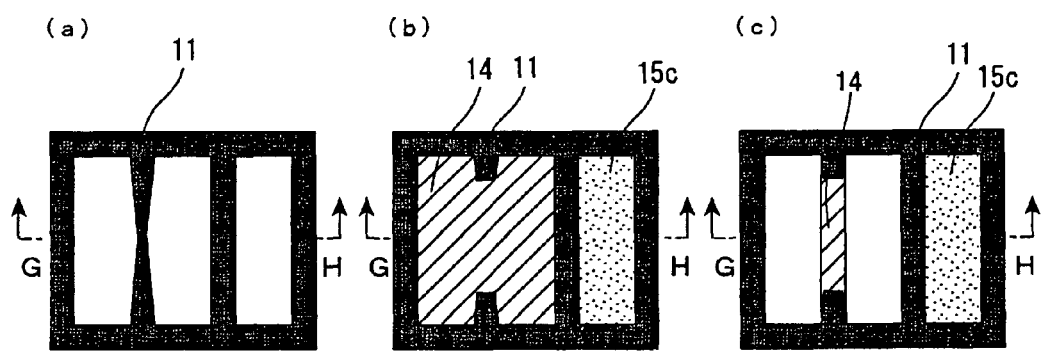
FIGS. 9 (a) to (c) are planar views schematically showing one example of a step flow of correction of a BM having a thin line defect.
Figure 10:
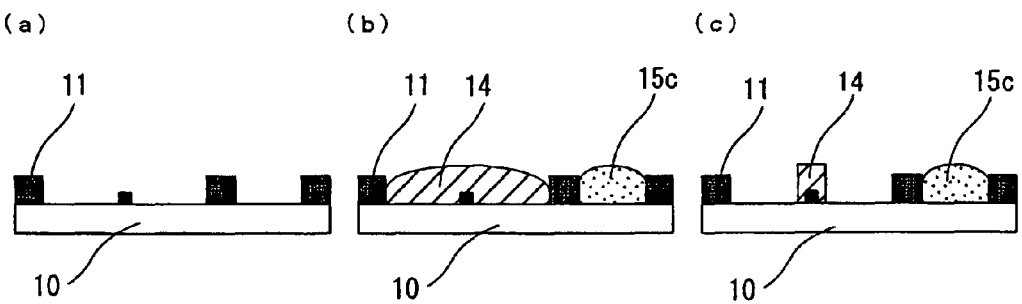
FIGS. 10 (a) to (c) are cross-sectional views schematically showing the CF substrates shown in FIGS. 9 (a) to (c) taken along line G-H.
Figure 11:
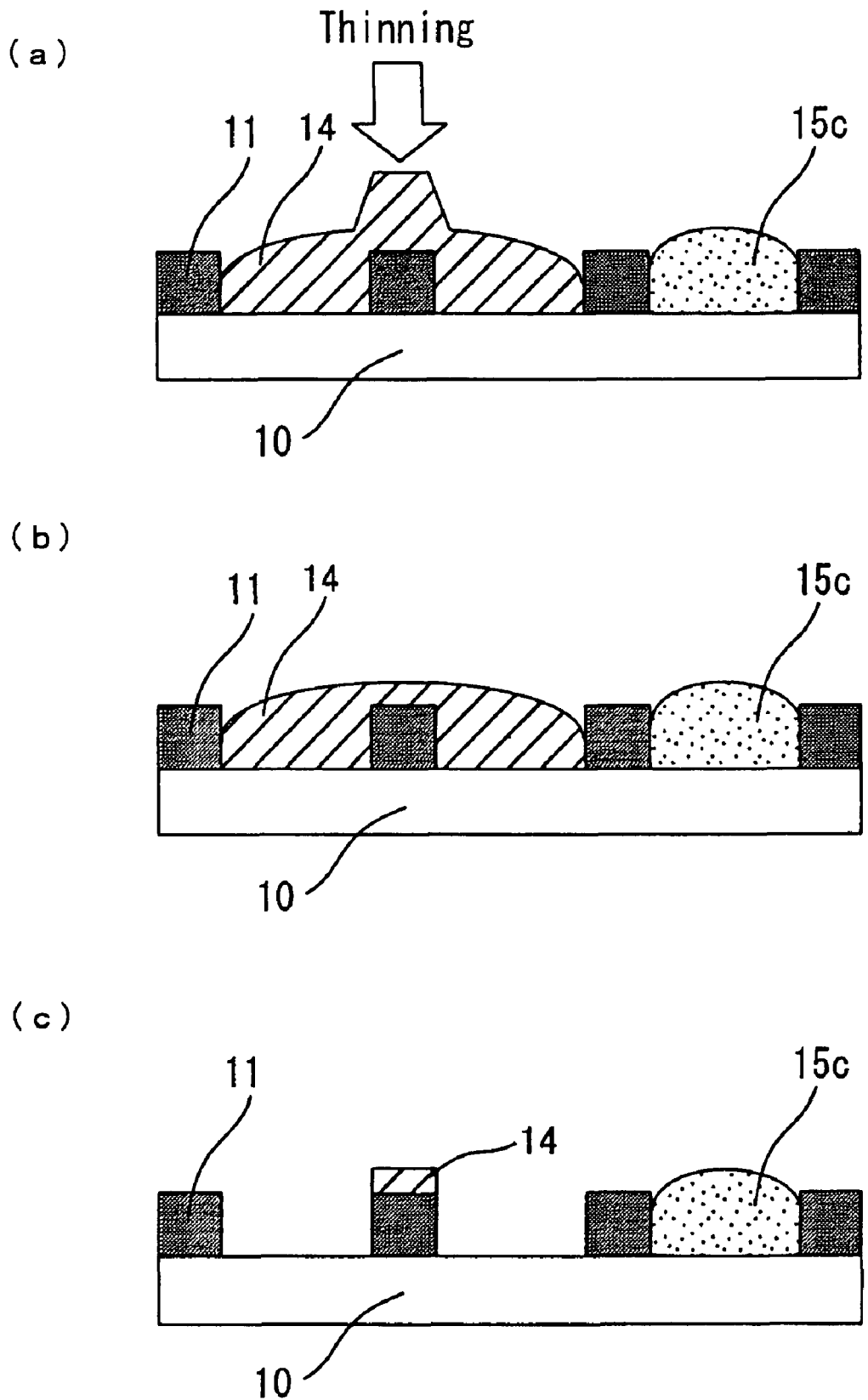
FIGS. 11 (a) to (c) are cross-sectional views schematically showing a step flow of thinning of a color mixing layer formed on a BM in production steps of a CF substrate.
Figure 12:
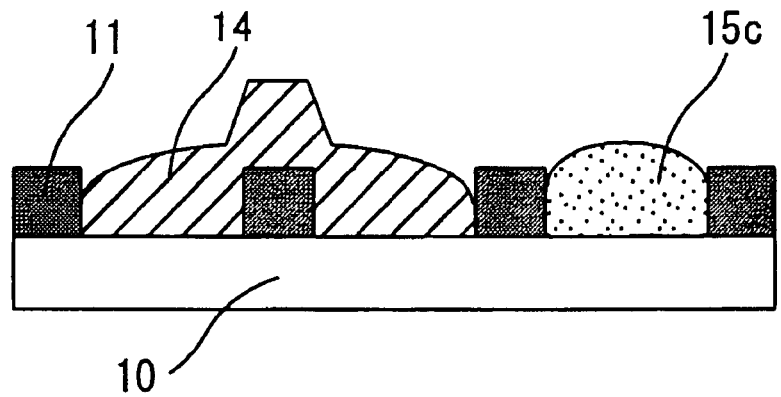
FIGS. 12 (a) to (c) are cross-sectional views schematically showing a step flow of thinning of a color mixing layer formed on a BM in production steps of a CF substrate.
Figure 12:
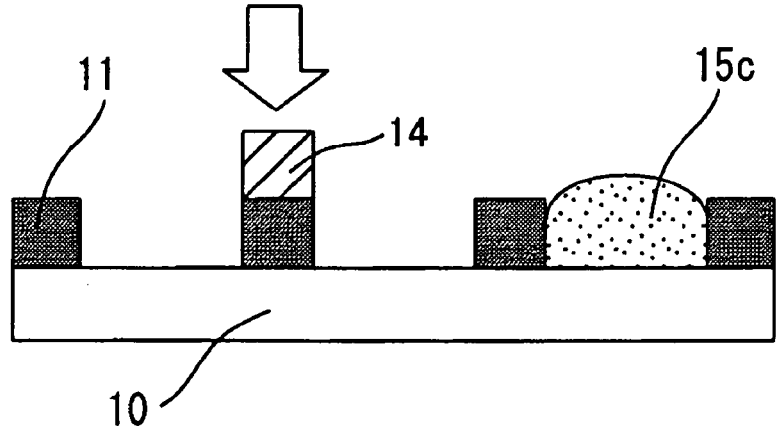
Figure 12:
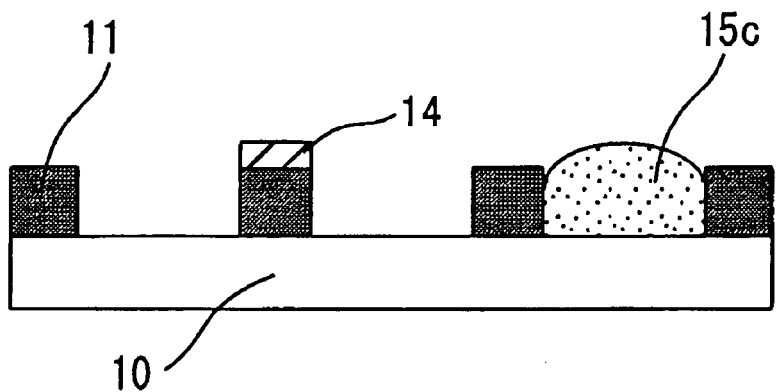
Figure 13:
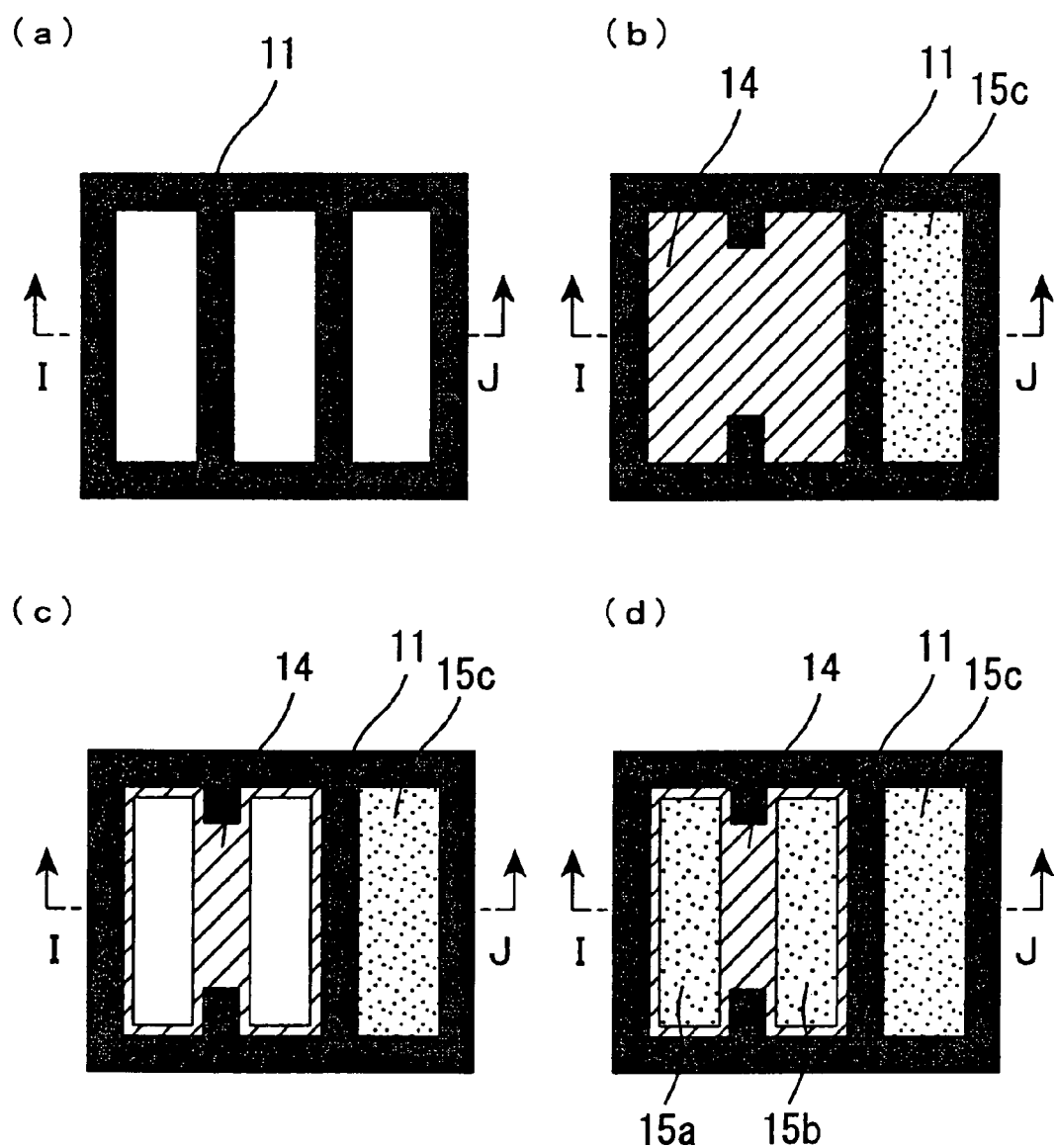
FIGS. 13 (a) to (d) are planar views schematically showing one example of a step flow of correction of a BM using a color mixing layer in production steps of a CF substrate.
Figure 14:
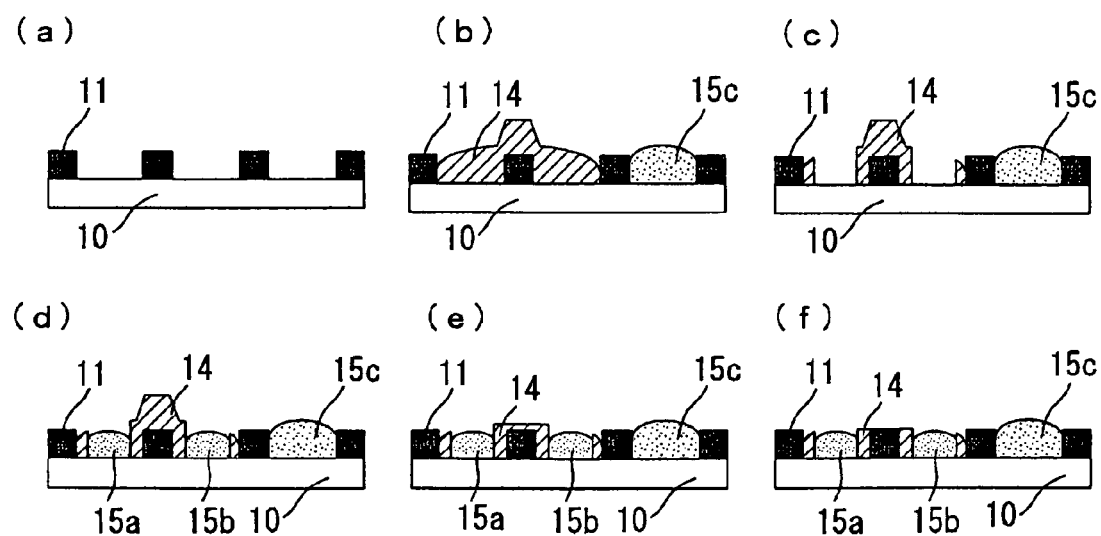
FIGS. 14 (a) to (d) are cross-sectional views schematically showing the CF substrates shown in FIGS. 13 (a) to (d) taken along line I-J.
Figure 15:
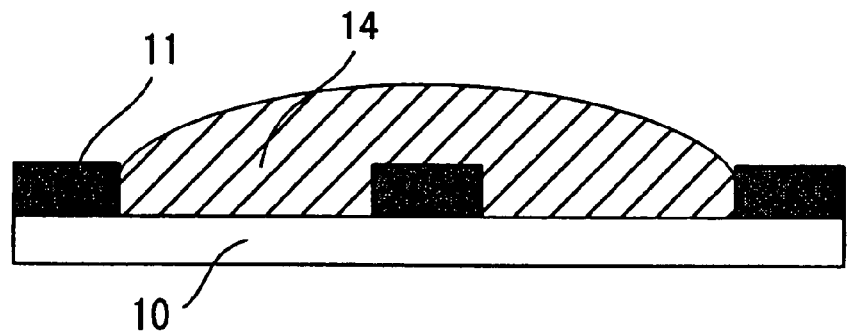
FIGS. 15 (a) to (d) are cross-sectional views schematically showing one example of a correction step flow using ultraviolet laser light in a step of opening color mixing defective pixels.
Figure 15:
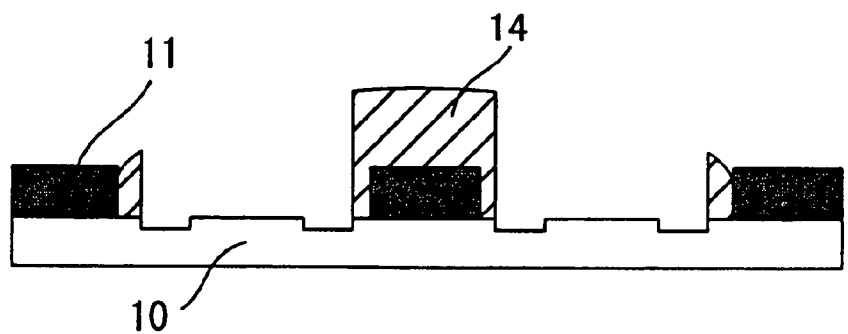
Figure 15:
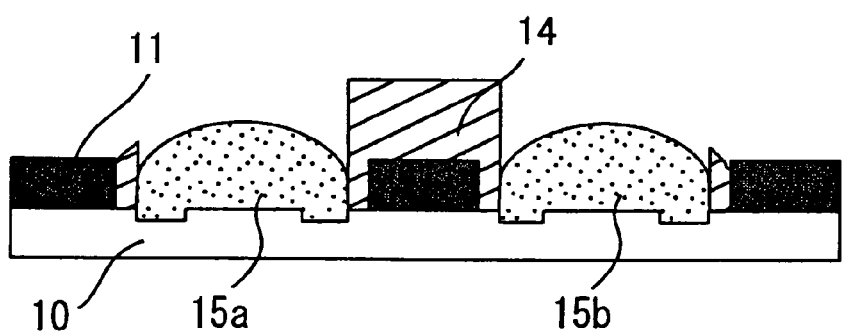
Figure 15:
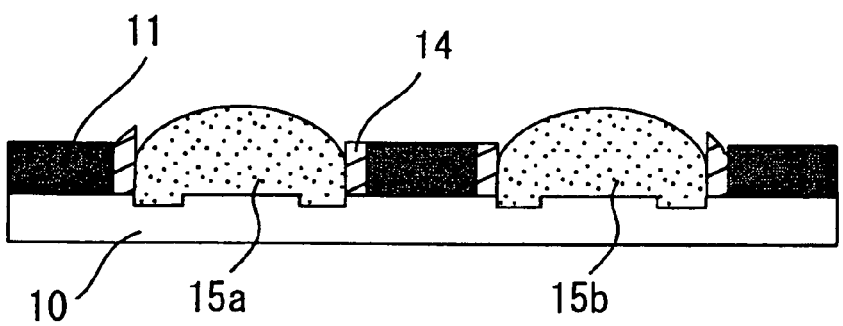
Figure 16:
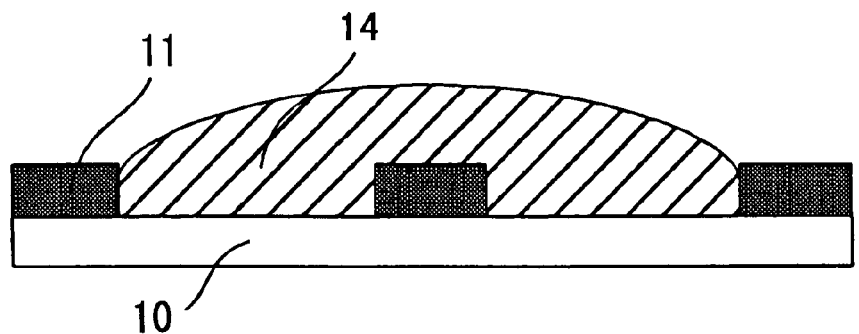
FIG. 16 is a cross-sectional view schematically showing one example of a correction step flow using ultraviolet laser light in a step of providing an opened region formed after color mixing defective pixels are opened, with lyophilicity.
Figure 16:
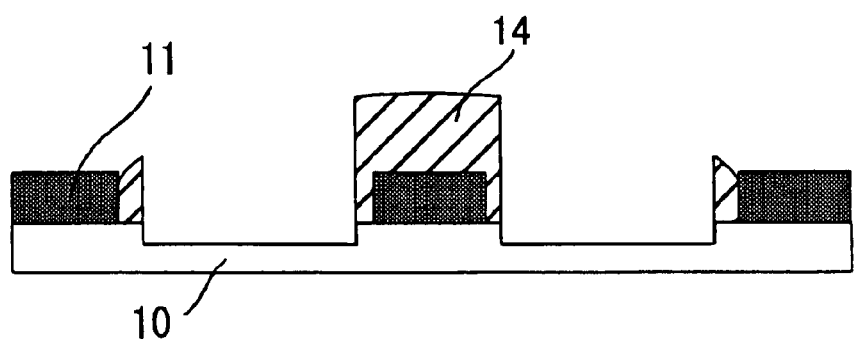
Figure 16:
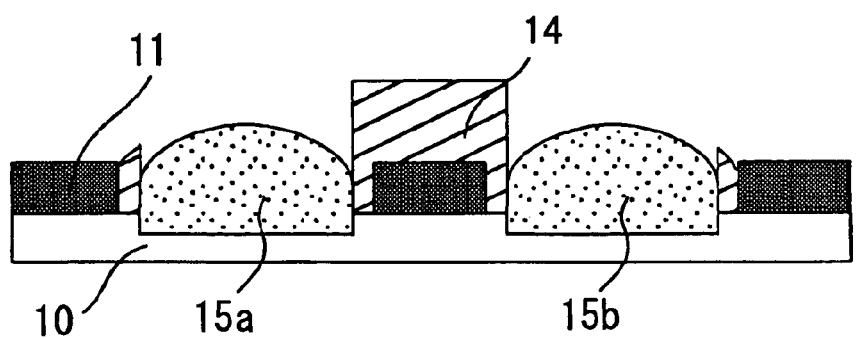
Figure 16:
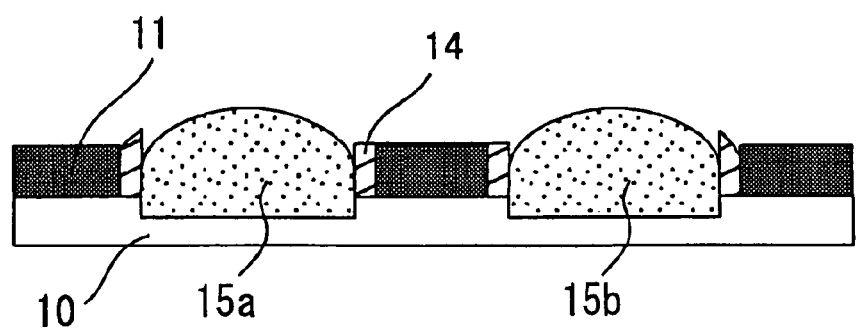

10: Glass substrate
11: Black matrix (BM, bank member)
12: Pin hole (through-hole)
13: Color mixing ink
14: Color mixing layer (color mixing member)
15a: First colored layer (colored layer)
15b: Second colored layer (colored layer)
15c: Third colored layer (colored layer)

The invention claimed is:

1. A color filter substrate comprising;
a bank member; and
at least two colored layer regions separated by the bank member on a substrate, a majority of the area in each region being formed of a colored layer material of a single color,
wherein the color filter substrate has a structure in which a color mixing member formed as a mixture of two or more of the colored layer materials each of a single different color is formed in a defective portion of the bank member or along the bank member, and
different single-color light-transmissive regions of the colored layer are respectively formed from each of the different colored layer materials.

2. The color filter substrate according to claim 1, wherein at least part of the bank member is constituted by a black matrix.

3. The color filter substrate according to claim 1,
wherein the defective portion of the bank member is a through-hole formed in a black matrix.

4. The color filter substrate according to claim 1,
wherein the defective portion of the bank member is a portion having a relatively thin film thickness of the bank member.

5. The color filter substrate according to claim 1,
wherein the defective portion of the bank member is a portion having a relatively thin width of the bank member.

6. The color filter substrate according to claim 1,
wherein the defective portion of the bank member is a disconnection portion of the bank member.

7. The color filter substrate according to claim 1,
wherein the color mixing member covers at least internal surface of the bank member surrounding the colored layer.

8. The color filter substrate according to claim 7,
wherein a width of the color mixing member covering the internal surface of the bank member is selected based on a color of an adjacent colored layer.

9. The color filter substrate according to claim 7,
wherein a difference in light transmittance between a corrected pixel and a pixel having no color mixing defect and having the same color as a color of the corrected pixel is 20% or less.

10. The color filter substrate according to claim 7,
wherein the substrate has a region with a surface ground by laser light irradiation, inside at least one pixel adjacent to the color mixing member.

11. The color filter substrate according to claim 10,
wherein the region is positioned at four corners of the pixel.

12. The color filter substrate according to claim 1,
wherein the colored layer is formed of a solidified ink.

13. A liquid crystal display device comprising the color filter substrate of claim 1.

14. The color filter substrate according to claim 1, wherein the number of colored layer materials each of a single color is two.

15. A production method of a color filter substrate comprising a bank member and a colored layer having at least two light-transmissive regions separated by the bank member on a substrate, wherein the bank member is corrected by forming a color mixing member formed of two or more intermixed colored layer materials each of a single color in a defective portion of the bank member or along the bank member, and
forming the different single-color light-transmissive regions of the colored layer respectively using each of the colored layer materials.

16. The production method of the color filter substrate according to claim 15,
wherein at least part of the bank member is constituted by a black matrix and
the production method of the color filter substrate comprises a color mixing member-forming step of forming the color mixing member by adding droplets containing colored layer materials of two or more colors in a defective portion penetrating the black matrix.

17. The production method of the color filter substrate according to claim 16, comprising a step of subjecting a surface of the defective portion penetrating the black matrix to a lyophobic treatment before the color mixing member-forming step.

18. The production method of the color filter substrate according to claim 15, comprising a color mixing member-removing step of removing the color mixing member in pixel regions with a color mixing defect.

19. The production method of the color filter substrate according to claim 18,
wherein at least part of the bank member is constituted by a black matrix, and
the production method of the color filter substrate comprises the steps of: adding a colored layer material-containing droplet in each pixel region; and
if the color mixing member is formed by generation of a color mixing defect in both adjacent pixel regions of the defective portion of the bank member, removing the color mixing member in the pixel regions except at least a portion alternatively used as the bank member.

20. The production method of the color filter substrate according to claim 18,
wherein at least part of the bank member is constituted by a black matrix and
the production method of the color filter substrate comprises the steps of:
if the defective portion of the bank member is detected, forming the color mixing member by causing a color mixing defect by adding a colored layer material-containing droplet in each pixel region, and further adding a droplet containing a colored layer material of a color different from a color of the colored layer material-containing droplet in at least one of both adjacent pixel regions of the defective portion of the bank member; and removing the color mixing member in the pixel regions except at least a portion alternatively used as the bank member.

21. The production method of the color filter substrate according to claim 18, wherein at least part of the bank member is constituted by a black matrix and the production method of the color filter substrate comprises the steps of: adding a colored layer material-containing droplet in each pixel region; and if the color mixing member is formed by generation of color mixing defective pixels, removing the color mixing member in the pixel regions except the color mixing member in an outer edge of the color mixing defective pixels.

22. The production method of the color filter substrate according to claim 18, wherein the color mixing member-removing step is performed using laser light having a wavelength absorbed by the substrate.

23. The production method of the color filter substrate according to claim 15, wherein the defective portion of the bank is a portion having an insufficient film thickness, a portion having an insufficient width, and/or a disconnection portion.

24. The production method of the color filter substrate according to claim 18, wherein in the color mixing member-removing step, an area removed is varied depending on a color of a colored layer formed in the pixel regions after the color mixing member is removed.

25. The production method of the color filter substrate according to claim 18, wherein a colored layer is formed in the pixel regions after the color mixing member is removed in such a way that a difference in light transmittance between a color mixing defect-corrected pixel and a pixel with no color mixing defect is 20% or less.

26. The production method of the color filter substrate according to claim 18, comprising a step of subjecting the color mixing member left in an outer edge of the pixel regions after the color mixing member is removed to a lyophobic treatment.

27. The production method of the color filter substrate according to claim 18, wherein the color mixing member-removing step is performed using laser light having a wavelength substantially not absorbed by the substrate, and the production method comprises a step of subjecting a region after the color mixing member is removed to a lyophilic treatment.

28. The production method of the color filter substrate according to claim 27, comprising a step of irradiating the region after the color mixing member is removed, with laser light having a wavelength longer than the wavelength of the laser light used in the color mixing member-removing step.

29. The production method of the color filter substrate according to claim 27, comprising an ultraviolet laser light-irradiating step of irradiating the region after the color mixing member is removed, with ultraviolet laser light.

30. The production method of the color filter substrate according to claim 29, wherein the ultraviolet laser light-irradiating step is performed for four corners of the region after the color mixing member is removed.

31. The production method of the color filter substrate according to claim 15, wherein a colored layer material-containing droplet is added using an ink jet device.

32. The production method of the color filter substrate according to claim 15, comprising a step of grinding the color mixing member formed on the bank member.

33. A production method of a liquid crystal display device, employing the production method of the color filter substrate of claim 15.

34. A production method of a color filter substrate comprising a bank member, at least part of the bank member being constituted by a black matrix, and a colored layer having pixel regions separated by the bank member on a substrate, wherein the production method of the color filter substrate comprises:

detecting a defective portion of the bank member, adding a colored layer material-containing droplet of a respective single color in each pixel region adjacent to the defective portion of the bank member such that the droplets mix at the defective portion, wherein the droplets that mix at the defective portion are two or more of colored layer materials each of a single different color, and different single-color light-transmissive regions of the colored layer corresponding to each pixel region, are respectively formed from each of the different colored layer materials; and removing a colored layer in one of the pixel regions adjacent to the defective portion of the bank member while not removing a portion formed in the other of the both adjacent pixel regions and a portion alternatively used as the bank member.

35. The production method of the color filter substrate according to claim 34, wherein the defective portion of the bank is a portion having an insufficient film thickness, a portion having an insufficient width, and/or a disconnection portion.

36. The production method of the color filter substrate according to claim 34, wherein the colored layer-removing step is performed using laser light having a wavelength substantially not absorbed by the substrate, and the production method of the color filter substrate comprises a step of subjecting a region after the colored layer is removed to a lyophilic treatment.

37. The production method of the color filter substrate according to claim 36, comprising a step of irradiating the region after the colored layer is removed, with laser light having a wavelength longer than the wavelength of the laser light used in the colored layer-removing step.

38. The production method of the color filter substrate according to claim 36, comprising an ultraviolet laser light-irradiating step of irradiating the region after the colored layer is removed, with ultraviolet laser light.

39. The production method of the color filter substrate according to claim 38, wherein the ultraviolet laser light-irradiating step is performed for four corners of the region after the colored layer is removed.

40. The production method of the color filter substrate according to claim 34,
 wherein the colored layer-removing step is performed using laser light having a wavelength absorbed by the substrate.

41. The production method of the color filter substrate according to claim 34,
 wherein the colored layer material-containing droplet is added using an ink jet device.

42. The production method of the color filter substrate according to claim 34, comprising a step of grinding the colored layer formed on the bank member.

43. A production method of a liquid crystal display device, employing the production method of the color filter substrate of claim 34.

* * * * *